Patented June 15, 1943

2,322,202

UNITED STATES PATENT OFFICE 2,322,202

TALLOEL ESTERS OF AMINO ALCOHOLS

David W. Jayne, Jr., Old Greenwich, and Harold M. Day, Cos Cob, Conn., assignors to American Cyanamid Company, New York, N. Y., a corporation of Maine No Drawing. Application December 13, 1941, Serial No. 422,922

12 Claims. (Cl. 250—97.5)

The present invention relates to the talloel acid esters of sulfonic acid salts of primary and secondary amino alcohols and to a process of preparing them.

This invention is in part a continuation of our copending application, Serial No. 325,394, filed March 22, 1940.

In accordance with the present invention we have found a process in which sulfonic acid salts of amino alcohols having at least one primary or secondary amino group are reacted with talloel acid to produce the esters thereof. The reaction proceeds smoothly between either the aliphatic sulfonic acid salts or aromatic sulfonic acid salts of such amino alcohols with talloel acids. However, it is not essential that the sulfonic acid salts of the primary or secondary amino alcohols be first produced and then reacted with talloel, as the same products may be obtained by reacting a mixture of an aromatic sulfonic acid, an amino alcohol having at least one primary or secondary amino group and talloel. When the esters are produced by using a mixture of the reactants, it is believed that the aromatic sulfonic acid being a stronger acid than the talloel acids may react with the amino group of the alcohol preferentially and thus cause the talloel to react with the hydroxyl group to give an ester. Irrespective of which method is employed, we have found that excellent yields of talloel esters are obtained.

The reaction products of the sulfonic acid salts of amino alcohols and the talloel of the present invention are useful as wetting agents, detergents, emulsifying agents, dispersing agents and flotation reagents, particularly as promoters in the flotation of acidic silicious gangue. Many of the compounds are soluble in the common aliphatic and aromatic hydrocarbons which very greatly increases their usefulness.

The talloel esters of the sulfonic acid salts of amino alcohols of the present invention may also be utilized for the production of talloel esters of amino alcohols, by treatment of the ester salts with a suitable alkali. The talloel esters so produced are free from contamination with amides and many of the difficulties of the prior methods are eliminated.

The following examples are further illustrations of the present invention, but the invention is not restricted thereby. The parts are given by weight.

Example 1

170 parts of technical grade benzene sulfonic acid (93%–94% pure) and 338 parts of talloel (acid value 165.5) were charged into a 1-liter, 3-neck flask fitted with a thermometer, agitator and condenser. Sixty-five parts of monoethanolamine was added to the flask, agitation started and the batch heated to 250° C., 18 cc. of water being removed by distillation. The batch was then cooled to room temperature. The product was a very viscous, dark colored, homogeneous paste, soluble in alcohol and slightly soluble in water.

Example 2

A mixture of 37 parts of pure benzene sulfonic acid . 1½ $H_2O$ and 12 parts of monoethanolamine was heated in an open beaker to 160° C. Then 67 parts of talloel was added and the mix heated to 225° C. with agitation, then cooled to room temperature. The product was similar to that obtained in Example 1.

Example 3

A mixture of 18.5 parts of benzene sulfonic acid . 1½ $H_2O$, 33.5 parts of talloel and 10.5 parts of diethanolamine was heated in an open beaker to 250° C., then cooled to room temperature. The product was a dark-colored, homogeneous paste, soluble in alcohol and fairly soluble in water.

Example 4

Nineteen parts of p-toluene sulfonic acid . 1 $H_2O$ and 6 grams of monoethanolamine were heated to 150° C. in an open beaker, then 33.8 parts of talloel added and the batch heated to 225° C., then cooled to room temperature. The product was similar in appearance and physical properties to the equivalent product made from benzene sulfonic acid.

The talloel, employed for producing the compounds in accordance with our invention, as well known in the art, is composed or made up of a mixture of higher fatty acids and rosin acids being obtained as a by-product from the sulphate paper making process. We may use a highly purified form of talloel which usually contains a higher percentage of fatty acids than rosin acids or we may use crude talloel containing about equal amounts of fatty acids and rosin acids or the talloel may contain a higher percentage of rosin acids than talloel acids. It is, therefore, an advantage of the present invention that the relatively cheap talloel may be employed for producing a class of esters having considerable commercial utility.

Likewise various other organic sulfonic acid salts of amino alcohols having at least one primary or secondary amino group may be used in place of all or part of those in the above examples and the invention is not limited to those of a particular series. Thus, for example, in addition to the common aromatic sulfonic acids of the benzene series employed in the examples, those of diphenyl, naphthalene, anthracene, phenanthrene series may be used. The aliphatic sulfonic acids may likewise be employed such as those of paraffin hydrocarbons of 12–18 carbon atoms in length, lignin-sulfonic acid, guanyl urea sulfonic acid, dodecyl sulfonic acid and the like, also compounds such as toluene thiosulfonic acid.

Representative amino alcohols which may be employed in preparing the organic sulfonic acid salts in addition to those of the above examples and which may be used in place of all or part thereof are: monopropanol amine, dipropanol amine, mono isopropanol amine, diisopropanol amine, monobutanol amine, mono isobutanol amine, and various other alkyl amino alcohols such as:

2-methyl 2 hydroxy 1 amino propane
    2 methyl 2 hydroxy 4 amino butane
    2 methyl 2 hydroxy 5 amino pentane
    2 methyl 2 hydroxy 6 amino hexane
    Hydroxyethyl ethylene diamine
    2 amino 1 butanol
    2 amino 2 methyl 1 propanol
    2 amino 2 methyl 1,3 propanediol
    2 amino 2 ethyl 1,3 propanediol
    Tri(hydroxy methyl) amino methane or any amino alcohol or derivative thereof having at least one primary or secondary amino group capable of forming a salt with an organic sulfonic acid and at least one hydroxy group capable of forming an ester with a carboxylic acid.

The reaction temperatures employed in the foregoing examples may be varied within certain limits. Similarly the time of heating may be varied within certain limits. In general, when the lower temperatures are employed, a long period of time is required for the completion of the reaction, while at the higher temperatures the reaction may be completed in a very short time. The reaction temperature may be varied from 150° to about 300° C. In our preferred method the final reaction temperature is within the range of about 200° to 275° C. These reaction temperatures apply only to those processes wherein the reaction is carried out in the absence of a solvent, and it should be distinctly understood that esterification may be carried out at lower temperatures when solvents are employed. The ordinary organic solvents, such as toluol, xylol, etc., may be employed and the reactants simply refluxed or boiled therein until esterification has taken place and the solvent then removed by distillation.

We claim:

1. A process of producing talloel esters which consists of heating at a temperature of at least 150° C. a mixture comprising an organic sulfonic acid, an amino alcohol having at least one member of the group consisting of primary and secondary amino groups and having at least one free hydroxy group, and talloel.

2. A process of producing talloel esters which consists of heating at a temperature of at least 150° C. a mixture comprising an aromatic sulfonic acid, an amino alcohol having at least one member of the group consisting of primary and secondary amino groups and having at least one free hydroxy group, and talloel.

3. A process of producing talloel esters which consists of heating at a temperature of at least 150° C. a mixture comprising an aromatic sulfonic acid salt of an amino alcohol having at least one member of the group consisting of primary and secondary amino groups and having at least one free hydroxy group with talloel.

4. The talloel esters of organic sulfonic acid salts of amino alcohols having at least one of the radicals of the group consisting of primary amino radicals and secondary amino radicals.

5. Talloel esters of organic sulfonic acid salts of amino alcohols having at least one primary amino group.

6. Talloel esters of organic sulfonic acid salts of amino alcohols having at least one secondary amino group.

7. Talloel esters of aromatic sulfonic acid salts of amino alcohols having at least one of the radicals of the group consisting of primary amino radicals and secondary amino radicals.

8. Talloel esters of aromatic sulfonic acid salts of amino alcohols having a primary amino group.

9. Talloel esters of aromatic sulfonic acid salts of amino alcohols having a secondary amino group.

10. Talloel esters of p-toluene sulfonic acid salts of amino alcohols having at least one of the radicals of the group consisting of primary amino radicals and secondary amino radicals.

11. Talloel esters of p-toluene sulfonic acid salts of amino alcohols having a primary amino group.

12. Talloel esters of p-toluene sulfonic acid salts of amino alcohols having a secondary amino group.

DAVID W. JAYNE, Jr.
HAROLD M. DAY.